United States Patent
Ullrich et al.

(10) Patent No.: US 7,769,535 B2
(45) Date of Patent: Aug. 3, 2010

(54) METHOD AND DEVICE FOR DOSING FUEL WHICH IS TO BE INJECTED INTO A COMBUSTION CHAMBER OF AN INTERNAL COMBUSTION ENGINE

(75) Inventors: Johannes Ullrich, Russelsheim (DE); Roland Steininger, Russelsheim (DE); Jurgen Grimm, Russelsheim (DE); Stefan Lang, Russelsheim (DE); Julian Kuric, Russelsheim (DE); Viktor Boschmann, Russelsheim (DE); Daniela Bollmann, Russelsheim (DE)

(73) Assignees: Hyundai Motor Company, Seoul (KR); Kia Motors Corporation, Seoul (KR); Hyundai Motor Europe Technical Center GmbH, Russelshein (DE)

( * ) Notice: Subject to any disclaimer, the term of this patent is extended or adjusted under 35 U.S.C. 154(b) by 0 days.

(21) Appl. No.: 12/357,068

(22) Filed: Jan. 21, 2009

(65) Prior Publication Data

US 2010/0100302 A1 Apr. 22, 2010

(30) Foreign Application Priority Data

Oct. 17, 2008 (DE) ...................... 10 2008 042 933

(51) Int. Cl.
*F02B 3/10* (2006.01)
*F02D 41/30* (2006.01)

(52) U.S. Cl. .................. 701/110; 701/104; 123/436; 123/299

(58) Field of Classification Search ................ 701/103, 701/104, 105, 110; 123/299, 300, 480, 305, 123/436

See application file for complete search history.

(56) References Cited

U.S. PATENT DOCUMENTS

| 4,782,803 | A | * | 11/1988 | Kikuchi | 123/300 |
| 5,893,347 | A | * | 4/1999 | McGee et al. | 123/299 |
| 6,101,986 | A | * | 8/2000 | Brown et al. | 123/27 GE |
| 6,622,692 | B2 | * | 9/2003 | Yomogida | 123/299 |
| 6,651,613 | B2 | * | 11/2003 | Rodier | 123/299 |
| 2008/0103675 | A1 | * | 5/2008 | Ishizuka et al. | 701/103 |

FOREIGN PATENT DOCUMENTS

| EP | 1712768 A2 | | 10/2006 |
| JP | 2003-269229 | * | 9/2003 |
| WO | WO2007006660 A1 | | 1/2007 |

* cited by examiner

*Primary Examiner*—Hai H Huynh
(74) *Attorney, Agent, or Firm*—Morgan, Lewis & Bockius LLP

(57) ABSTRACT

Method for dosing fuel injected into an engine, with a fuel quantity for an injector, the fuel quantity being divided into pilot and main injections for respective activation duration having activation duration corrective value, the method may include storing correlation data between fuel injection quantity and activation time under at least a state parameter of the injector, wherein the fuel injection quantity includes reference total injection quantities determined for predetermined operating states of the engine, determining a present operating state of the engine, placing the engine into one of the predetermined operating states, determining a present total injection quantity and a reference total injection quantity in one of the at least a state parameter of the injector, and defining the respective activation duration corrective value for the pilot and main injection considering a difference between the reference total injection quantity and the present total injection quantity.

19 Claims, 5 Drawing Sheets

METHOD AND DEVICE FOR DOSING FUEL WHICH IS TO BE INJECTED INTO A COMBUSTION CHAMBER OF AN INTERNAL COMBUSTION ENGINE

CROSS-REFERENCE TO RELATED APPLICATION

The present application claims priority to German Patent Application No. 102008042933.3 filed on Oct. 17, 2008, the entire contents of which are incorporated herein for all purposes by this reference.

BACKGROUND OF THE INVENTION

1. Field of the Invention

The present invention relates to a method and to a device for dosing fuel which is to be injected into a combustion chamber of an internal combustion engine, with a fuel quantity being divided into at least one pilot injection quantity and a main injection quantity, and with respective activation duration corrective values of an injection device for the injection of the pilot injection quantity and the main injection quantity defined.

2. Description of Related Art

Although the present invention and the problem on which it is based are explained below on the basis of common-rail injection systems of passenger vehicle diesel engines, the invention is not restricted thereto, but rather can be applied generally to any desired internal combustion engine.

A common-rail injection system has a common high-pressure fuel accumulator with corresponding outlets for supplying the individual cylinders of an internal combustion engine with fuel. The supply to the cylinders is controlled by means of so-called injectors which are realized for example in the form of piezoelectrically or electromagnetically activated valves. Short paths which can be realized between the injection location and the injector result in low pressure rise times, which benefits the combustion process and its control. It is possible to realize different injection methods, for example a pilot injection, a main injection, and a post-injection, which may be freely programmed by means of modern control units. Pilot injections serve in particular for pre-conditioning of the combustion chamber with regard to temperature and oxygen proportion.

Future emissions standards will require pilot injection quantities which are less than 0.8 mg/injection stroke and which occur in particular in the part-load range. Modern-day fuel dosing concepts are however suitable only for injection quantities which are greater than 0.8 mg/injection stroke.

The injection quantities of the injectors are subject in particular to aging effects which can lead both to an increase and also to a decrease in the injection quantity for a constant activation time of the injector. There are no cost-effective measuring systems for injection quantities which are less than 0.8 mg/injection stroke. Here, too, modern measuring methods are slow and are not sufficiently precise for such small injection quantities.

Furthermore, variance in the injector characteristic variables on account of production tolerances adversely affects dosing accuracy. A reduction in production tolerances of said type will dramatically increase the costs for the injectors.

Said aging drift of the injection quantity for a constant activation duration is compensated nowadays only by means of indirect methods which cannot distinguish between an actual aging process and secondary effects of the drive chain or of the internal combustion engine.

FIG. 5 is an illustration of the dependency of particle emissions PM and NOx emissions for different pilot injection quantities and different $\lambda$ values.

In FIG. 5, the NOx emissions are plotted on the x-axis and the particle emissions PM are plotted on the y-axis. The curve K2 shows an operating point OP2 for an optimum setting of a pilot injection quantity at a base value, for example, 0.8 mg/injection stroke. Corresponding to the operating state of the internal combustion engine, the $\lambda$-EGR control (EGR: exhaust-gas recirculation) moves the operating point OP2 along the curve K2.

If the pilot injection quantity now changes, this leads to a shift to an operating point OP1 on the curve K1 in the case of an excessively large pilot injection quantity and to a shift to an operating point OP3 on the curve K3 in the case of an excessively small pilot injection quantity. In particular, a shift to an excessively large pilot injection quantity brings about an increase in emissions and particle output.

A shift to relatively low pilot injection quantities of less than 0.3 mg/injection stroke may even make combustion, and therefore pre-conditioning of the combustion chamber, no longer be carried out.

EP 1 712 768 A2 discloses a method and a device for controlling the fuel dosing in at least one combustion chamber of an internal combustion engine, with an activation variable which defines the injected fuel quantity being predefined on the basis of at least one characteristic operating variable. A corrective value for correcting the activation variable is predefined on the basis of a variable which characterizes the cylinder pressure.

WO 2007/006660 A1 describes a method for dosing fuel in a combustion chamber of an internal combustion engine, in which method a fuel quantity which is to be dosed for a combustion is dosed by means of a pilot injection and at least one further partial injection, and in which method, during operation of the internal combustion engine, quantity errors in the pilot injection are determined from the signal of a bodyshell sensor. A corrective value is formed as a function of the quantity error of the pilot injection, and at least one of the further partial injections is corrected using the corrective value. Said method permits the derivation of control parameters for the pilot injection quantity of the order of magnitude of 1 mg/injection stroke. If no combustion whatsoever occurs at excessively small pilot injection quantities, said method is equally blind, and thus cannot define a corrective value.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a method and a device for dosing fuel which is to be injected into a combustion chamber of an internal combustion engine, which method and device permit very precise definition of the one or more pilot injection quantities and of the main injection quantity without additional hardware being required.

In an aspect of the present invention, method for dosing fuel which is to be injected into a combustion chamber of an engine, with a fuel quantity dosed for an injector of the engine, the fuel quantity being divided into at least one pilot injection and a main injection for respective activation duration having activation duration corrective value, may include storing correlation data between fuel injection quantity and activation time under at least a state parameter of the injector, wherein the fuel injection quantity includes reference total injection quantities determined for predetermined operating states of the engine, determining a present operating state of the engine, placing the engine into one of the predetermined operating states, determining a present total injection quantity in the present operating state of the engine and a reference total injection quantity in the one of the predetermined operating states and in one of the at least a state parameter of the injector, and/or defining the respective activation duration corrective value for the pilot injections and the main injection in consideration of a difference between the reference total injection quantity and the present total injection quantity.

The one of the at least a state parameter of the injector may be a pressure in the injector.

The respective activation duration corrective value may be determined by an activation duration difference divided by the number of pilot and main injections, the activation duration difference corresponding to difference of activation time of the reference total injection quantity and activation time of the present total injection quantity.

The fuel quantity which is to be dosed for the respective cylinder may be divided into a first pilot injection, a second pilot injection and a single main injection.

The present operating state of the engine may be an idle operating state.

The activation durations for the pilot injections may be constant in the present operating state of the engine, and the main injection quantity is regulated by an idle regulator to attain a predetermined idle nominal speed.

Injection amount of the pilot injection may be between approximately 0.5 and approximately 0.8 mg/injection stroke.

The injection device may be a common-rail injection device and the respective activation duration corrective value for the pilot injections and the main injection is defined at different operating pressures of the common-rail injection.

The reference total injection quantity may be determined with an accuracy of approximately ±5%.

In another aspect of the present invention, device for dosing fuel which is to be injected into a combustion chamber of the engine, with a fuel quantity dosed for an injector of the engine, the fuel quantity being divided into at least one pilot injection and a main injection for respective activation duration having activation duration corrective value, may include a memory device for storing correlation data between fuel injection quantity and activation time under at least a state parameter of the injectors wherein the fuel injection quantity includes reference total injection quantities determined for predetermined operating states of the engine, a determining device for determining a present total injection quantity in a present operating state of the engine and a reference total injection quantity in the one of the predetermined operating states and in one of the at least a state parameter of the injector when the engine is placed into one of the predetermined operating states, and/or a defining device for defining the respective activation duration corrective value for the pilot injections and the main injection in consideration of a difference between the reference total injection quantity and the present total injection quantity.

The one of the at least a state parameter of the injector may be a pressure in the injector.

The respective activation duration corrective value may be determined by an activation duration difference divided by the number of pilot and main injections, the activation duration difference corresponding to difference of activation time of the reference total injection quantity and activation time of the present total injection quantity.

The fuel quantity which is to be dosed for the respective cylinder may be divided into a first pilot injection, a second pilot injection and a single main injection.

The present operating state of the engine may be an idle operating state.

The activation durations for the pilot injections may be constant in the present operating state of the engine, and the main injection quantity is regulated by an idle regulator to attain a predetermined idle nominal speed.

Injection amount of the pilot injection may be between approximately 0.5 and approximately 0.8 mg/injection stroke.

The injection device may be a common-rail injection device and the respective activation duration corrective value for the pilot injections and the main injection is defined at different operating pressures of the common-rail injection device.

The reference total injection quantity may be determined with an accuracy of approximately ±5%.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
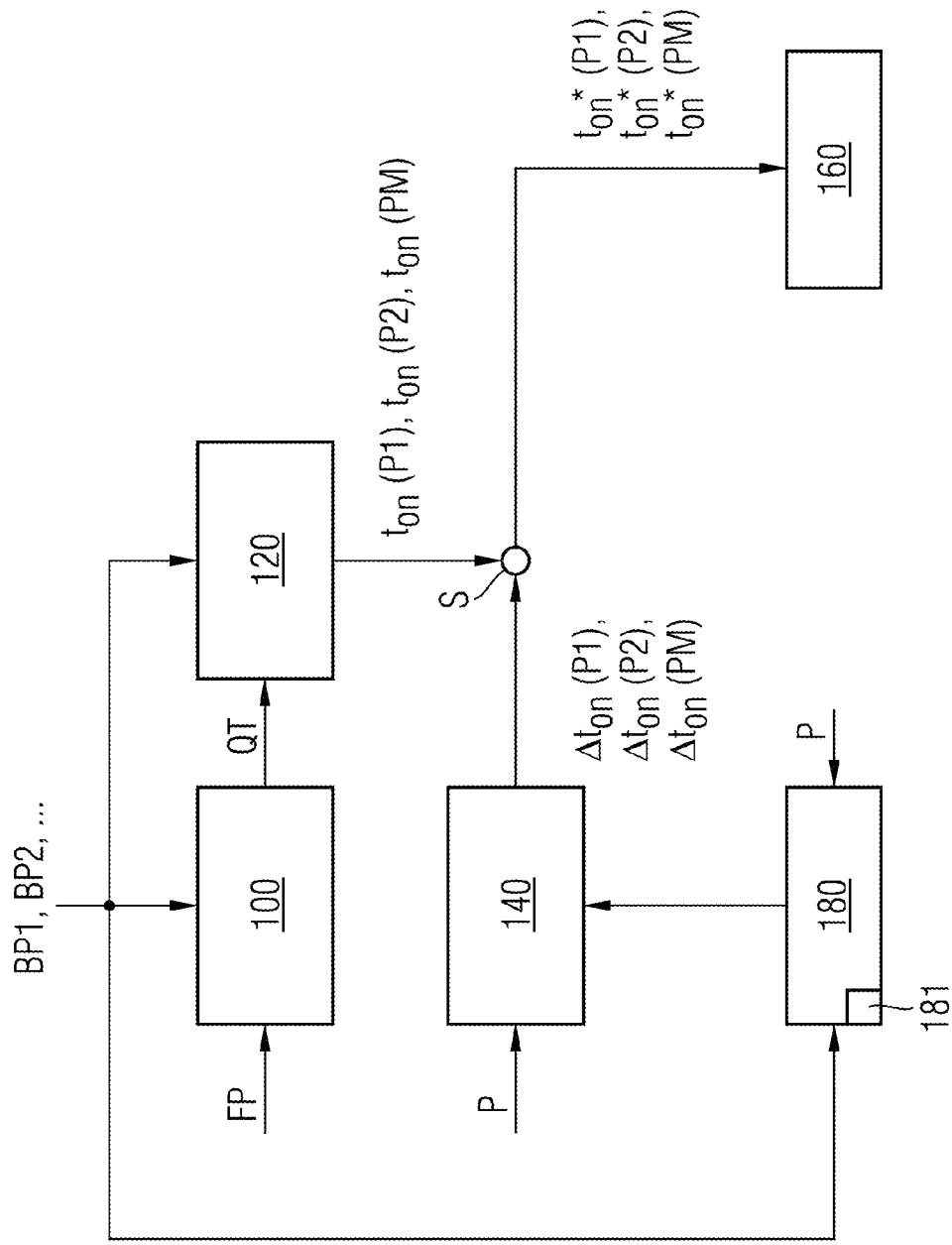
FIG. 1 shows a block diagram of an exemplary device, according to the present invention, for dosing fuel which is to be injected into a combustion chamber of an internal combustion engine.

FIG. 1 shows a block diagram of a device, according to an exemplary embodiment of the present invention, for dosing fuel which is to be injected into a combustion chamber of an internal combustion engine.

In FIG. 1, the reference symbol 100 denotes a fuel quantity determining device which, on the basis of a signal FP which represents a throttle pedal position, and on the basis of operating parameters BP1, BP2, . . . , determines a present total injection quantity QT which is to be injected.

A signal corresponding to the present total injection quantity QT to be injected and the operating parameters BP1, BP2 are input to an activation duration determining device 120. The activation duration determining device 120 outputs activation durations ton (P1), ton(P2) and ton(PM) which correspond to two pilot injections P1, P2 and a main injection PM in an exemplary embodiment of the present invention.

A correction device 140 outputs activation duration corrective values Δ ton (P1), Δ ton(P2) and Δ ton (PM) determined based on a present pressure P of the common-rail injector device.

The activation duration corrective values Δ ton(P1), Δ ton (P2) and Δ ton (PM) are added in an adding unit S, to the activation durations ton (P1), ton (P2) and ton(PM) determined by the activation duration determining device 120.

The activation duration corrective values of Δ ton(P1), Δ ton(P2), Δ ton(PM) may have either a negative or a positive sign and reflect the aging process of the injector.

The adding unit S therefore supplies corrected activation durations $$\text{ton}^*(P1)=\text{ton}(P1)+\Delta\text{ton}(P1)$$

$$\text{ton}^*(P2)=\text{ton}(P2)+\Delta\text{ton}(P2)$$

$$\text{ton}^*(PM)=\text{ton}(PM)+\Delta\text{ton}(PM)$$

to an activation device 160 for the injector.

The reference symbol 180 in FIG. 1 denotes a defining device for the cyclic or callable definition of the activation duration corrective values Δ ton(P1), Δ ton(P2) and Δ ton (PM) in a predetermined operating state of the associated internal combustion engine.

For this purpose, the defining device 180 comprises a memory device 181 in which correlations of injection quantity including a reference total injection quantity QT' verses activation time for a variety of predetermined operating state of the internal combustion engine, with state parameter of injector, which may be stored as a lookup table. The state parameter of injector may include various pressures of the common-rail injector device.

If the defining device 180 determines, on the basis of the operating parameters BP1, BP2, . . . which are supplied to it, that the internal combustion engine has been placed into the predetermined operating state, then said defining device 180 triggers the definition of the activation duration corrective values Δ ton(P1), Δ ton(P2), Δ ton(PM) for two pilot injection and the main injection.

For this purpose, under the predetermined operating state of the internal combustion engine, said defining device 180 determines a difference (Δ) between the stored reference total injection quantity QT' corresponding to the predetermined operating state of the internal combustion engine and the present total injection quantity QT corresponding to present operating state of the internal combustion engine.

The present total injection quantity QT may be determined on the basis of control unit data, such as the throttle pedal position and the operating parameters of an engine control unit as shown in FIG. 1.

On the basis of said difference and the state parameter such as the present pressure P of the common-rail injector device, it is then possible to calculate the activation duration corrective values Δ ton(P1), Δ ton(P2), Δ ton(PM), as will be explained in more detail below in connection with FIGS. 3 and 4.

Within the context of such a definition, the defining device 180 may demand a series of relevant present pressures P of the common-rail injector device, and carry out a separate definition at each individual pressure P.

Figure 2:
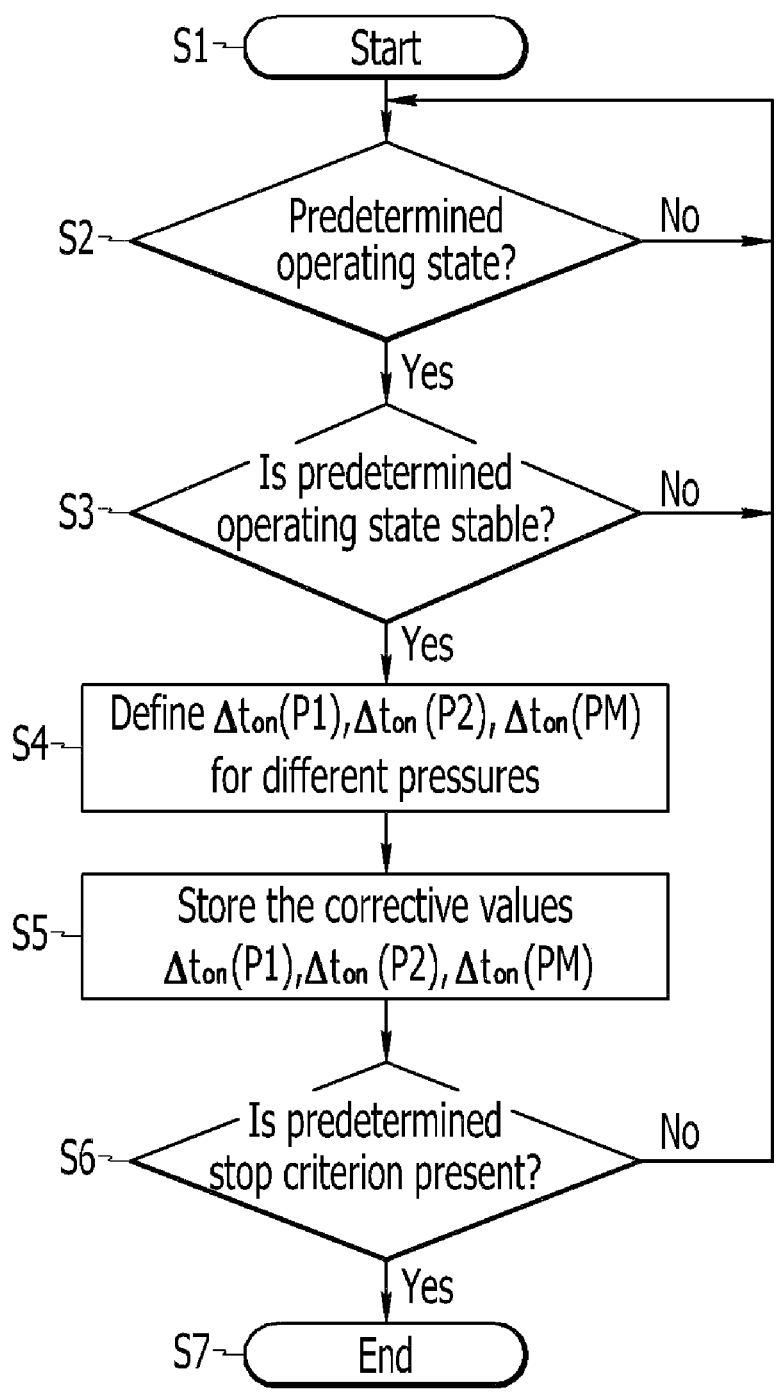
FIG. 2 shows a flow diagram for explaining the operation of an exemplary device, according to the present invention, for dosing fuel which is to be injected into a combustion chamber of an internal combustion engine.

FIG. 2 shows a flow diagram for explaining the operation of the device for dosing fuel which is to be injected into a combustion chamber of an internal combustion engine, according to an exemplary embodiment of the present invention.

In FIG. 2, the definition procedure begins at step S1.

In step S2, it is checked whether the predetermined operating state of an engine, for example an idle state at 800 rpm at an operating temperature of 90° C. and electrical auxiliary loads switched off, is satisfied. If this is not the case, the program continues step S2 until the predetermined operating state is met.

It should be noted that it is also possible at this point to enforce the predetermined operating state by means of suitable measures or signals to the driver if said predetermined operating state has not occurred for a long time and if a new definition is required. However, the predetermined operating state may be selected such that it occurs relatively frequently, for example as often as the above-mentioned idle state.

If the predetermined operating state is met, in step S3, it is checked whether the predetermined operating state of the internal combustion engine is stable. In an exemplary embodiment of the present invention, the stability may be predefined with a predetermined criterion. For example, a certain range of variance for operating state can be defined. Then if this is not the case, the program reverts to step S2; the program otherwise advances to step S4.

In step S4, the activation duration corrective values Δ ton (P1), Δ ton(P2), Δ ton(PM) are defined for a variety of predetermined pressures of the common-rail injection device of the internal combustion engine. That is, in this process, correlation between injection quantity including a reference total injection quantity QT' for the certain predetermined operating state and the activation duration corrective values Δ ton(P1), Δ ton(P2), Δ ton(PM) under various pressures of the common-rail injection device are stored in the memory device 180. Such pressures are for example 230 bar, 500 bar, 800 bar, 1100 bar, 1400 bar, 1700 bar.

After the activation duration corrective values Δ ton(P1), Δ ton(P2), Δ ton(PM) have been defined for all the predetermined pressures of the common-rail injection device, the program advances to step S5, in which the activation duration corrective values Δ ton(P1), Δ ton(P2), Δ ton(PM) are stored in the correction device 140 in the form of a characteristic value map as a function of the respective predetermined pressure.

The correction device 140 can therefore, with the aid of the present pressure signal P of the common-rail injector device which is supplied to it, supply the activation duration corrective values Δ ton(P1), Δ ton(P2), Δ ton(PM) corresponding to the present pressure P to the adding unit S during operation.

In step S6, it is subsequently checked whether a predetermined stop criterion is present, for example a deactivation of the internal combustion engine. One may appreciate the stop criterion and thus detailed explanation is omitted. Then if this is not the case, the program reverts to step S2. The program otherwise ends at step S7.

An example for defining the activation duration corrective values Δ ton(P1), Δ ton(P2), Δ ton(PM) for the activation duration ton(P1), ton(P2), ton(PM) is explained below with reference to FIGS. 3 and 4.

Figure 3:
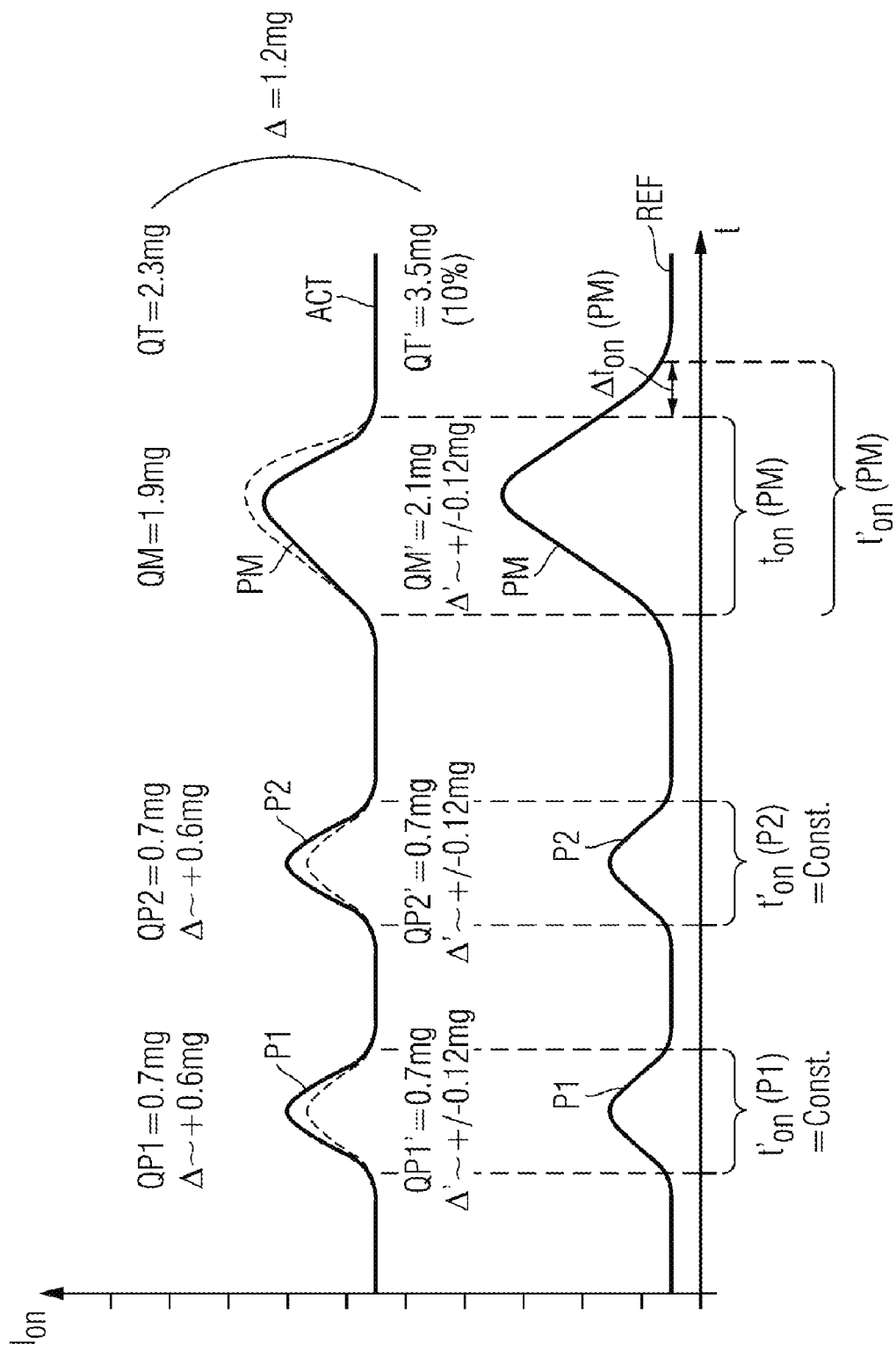
FIG. 3 shows a time-based diagram for explaining a method, according to an exemplary embodiment of the present invention, for dosing fuel which is to be injected into a combustion chamber of an internal combustion engine.

FIG. 3 shows a time-based diagram for explaining a method, according to an exemplary embodiment of the present invention, for dosing fuel which is to be injected into a combustion chamber of an internal combustion engine.

In FIG. 3, the time t is plotted on the x-axis and the injection profile Ion of the exemplary common-rail injection device of the internal combustion engine is plotted on the y-axis.

The curve REF denotes a reference injection profile, whereas the curve ACT denotes a present injection profile. The present injection profile ACT and the reference injection profile REF provide two pilot injections P1, P2 and a main injection PM as an exemplary embodiment. The internal combustion engine is situated in the idle state at 800 rpm, at an operating temperature of 90° C. and with auxiliary loads switched off.

From experiments, under this operating state the defining device 180 determines that a reference total injection quantity QT' in this operating state is 3.5 mg per injection stroke. The reference total injection quantity QT' can be determined in this operating state with an accuracy of 10%, which corresponds to an error of approximately ±3.5 mg/injection stroke.

The error is equally distributed, in each case with Δ' of approximately ±0.12 mg, between the two pilot injections P1 and P2 and the main injection PM.

The reference total injection quantity QT' is distributed between a first pilot reference injection quantity QP1'=0.7 mg/injection stroke, a second pilot reference injection quantity QP2'=0.7 mg/injection stoke and a main reference injection quantity QM'=2.1 mg/injection stroke.

Reference is now made to the present injection profile ACT. The activation duration ton' (P1), ton' (P2) for the two pilot injections P1, P2 are selected to be constant, that is to say, to be equal for the curves ACT and REF.

In contrast, the idle regulator regulates the activation duration of the main injection PM in such a way that a predetermined operating state, i.e., a predefined nominal idle speed is attained, for example 800 rpm, as stated above. If the pilot injections P1, P2 are afflicted with faults, for example on account of instances of aging, that is to say, said pilot injections do not correspond to their predefined first and second reference injection quantities of 0.7 mg/injection stroke.

Accordingly, the regulator varies the activation duration ton (PM) of the main injection PM in relation to the reference activation duration t' on (PM) of the main injection referring to the reference injection profile REF.

In the present case, the activation duration ton (PM) of the present injection profile ACT is reduced by a deviation Δ ton(PM) which results in a smaller activation duration ton (PM) during operation of the present injection profile ACT.

This means that, during the pilot injections P1, P2, the desired 0.7 mg injection quantity per injection stroke is not injected, but rather a larger value in the main injection PM on account of the aging of the injector (see dashed lines).

Figure 4:
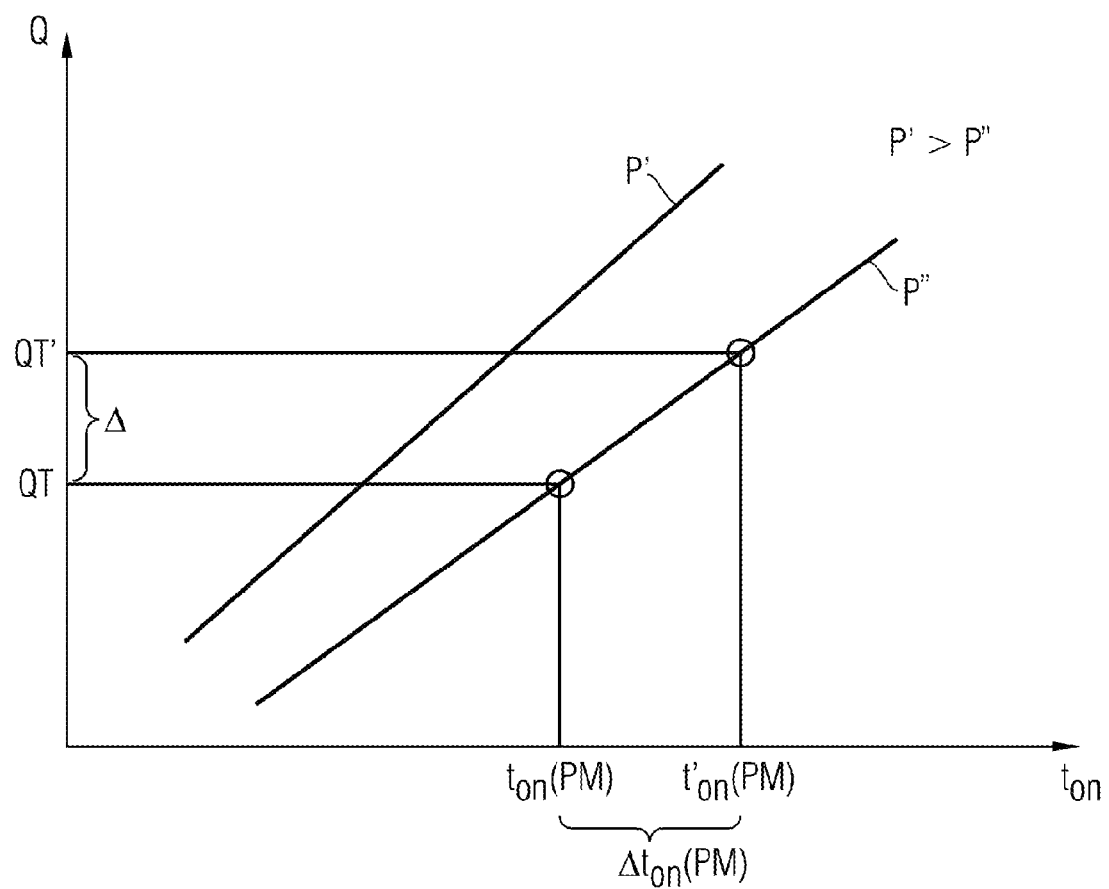
FIG. 4 shows an illustration of the dependency of an injection quantity Q on the activation time ton of an injector, used in the determination of corrective values of activation duration according an exemplary embodiment of the present invention.
Figure 5:
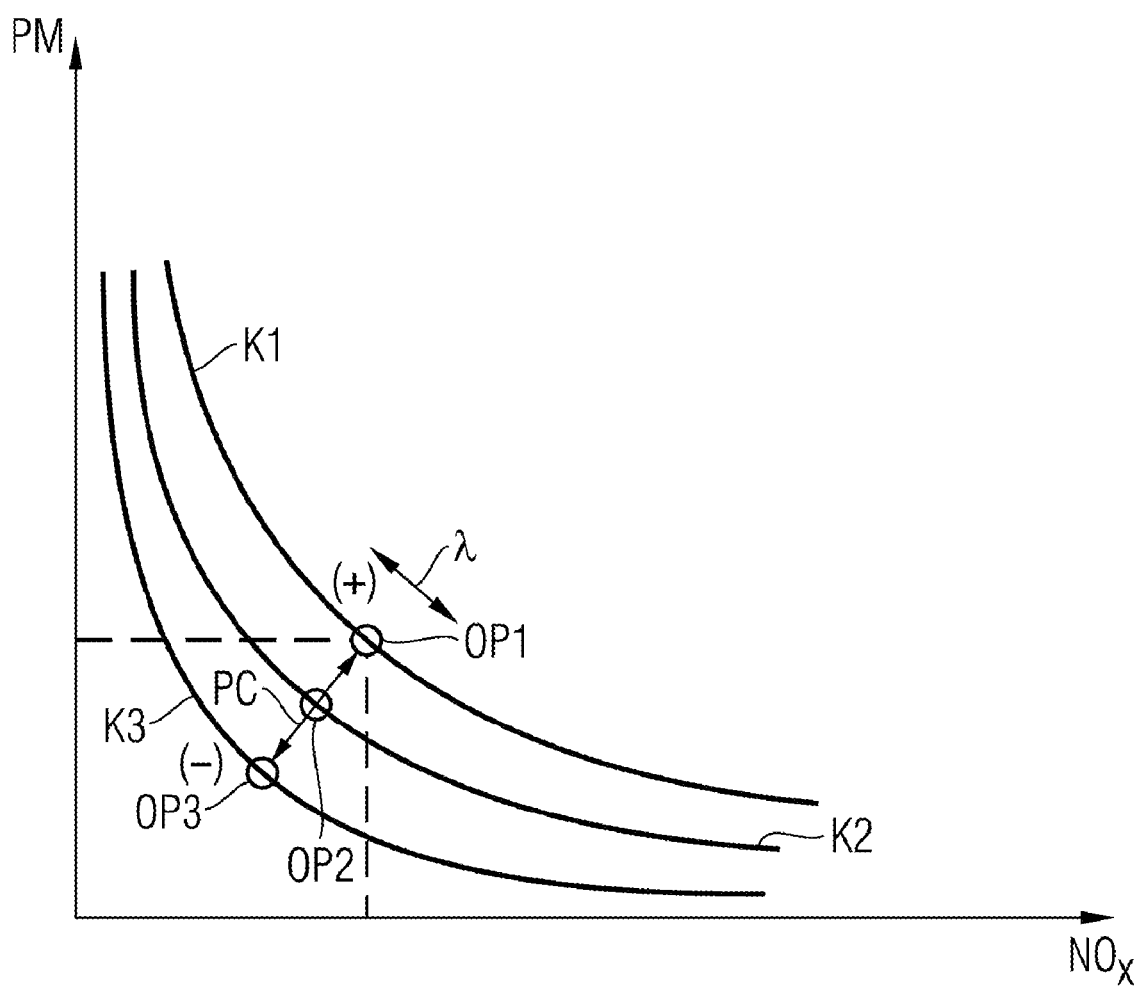
FIG. 5 shows an illustration of the dependency of particle emissions PM and NOx emissions for different pilot injection quantities and different λ values.

FIG. 4 illustrates the correlation of an injection quantity Q on the activation duration ton of an injector, used in the determination of activation duration corrective value Δ ton (PM) of the main injection PM in the exemplary embodiment of the present invention.

In FIG. 4, for the exemplary injector, the injection quantity Q is illustrated as a function of the activation time ton, specifically for different pressures P''', P', where P'>P'''.

If it is assumed that the present pressure P is on the P''' in the present injection profile ACT, then the activation duration corrective value Δ ton(PM) of the main injection PM can be determined from the reference total injection quantity OT' called from the memory device 181 on the base of the predetermined operating state of the engine and the present total injection quantity QT determined from present operating states such as a throttle pedal position and operating parameters.

Even though FIG. 4 illustrates a linear correlation between the injection quantity Q and the activation time ton the present invention is not limited thereto but can extend to a nonlinear correlation therebetween since the lookup table can illustrate nonlinear correlation between injection quantity Q and the activation time ton.

From the correlation according to FIG. 4, it is therefore possible to determine a difference Δ between the reference total injection quantity QT' and the present total injection quantity QT. Furthermore, the difference of Δ ton between the reference activation duration t' on (PM) and the present activation duration ton(PM) of the main injection PM can also be determined.

Said difference Δ is, in the present case, Δ=1.2 mg/injection stroke, and may be attributed causally in equal measure to the errors in the pilot injections P1, P2, but the injection quantities QP1, QP2 of the pilot injections P1, P2 may be in each case 0.6 mg/injection stroke too high.

Accordingly, in an exemplary embodiment of the present invention, all the activation durations for the pilot injections P1, P2 and the main injector PM must be corrected such that the respective injection quantity QP1, QP2, QM is lower by Δ/3=0.4 mg/injection stroke.

For the corresponding changes, the activation duration Δ ton(Δ/3) amended from the deviation Δ ton(PM) is respectively assigned to the pilot injections P1, P2 and the main injection PM. Accordingly the corrected activation duration of the pilot injections P1, P2 and of the main injection PM are therefore given by:

$$ton*(P1)=ton(P1)-\Delta ton(\Delta/3)$$

$$ton*(P2)=ton(P2)-\Delta ton(\Delta/3)$$

$$ton*(PM)=ton(PM)-\Delta ton(\Delta/3)$$

It is then possible to determine, on the basis of subsequent injection strokes, whether the activation duration ton (PM) of the main injection PM again corresponds to the reference activation duration ton'(PM). If this is the case, then the definition of the activation duration corrective values for the corresponding pressure P is ended, and may be resumed for further pressures P of the common-rail injection device. If this is not the case, then it is possible if appropriate for a further iteration to be carried out for the present pressure P.

Even though the present invention has been described above on the basis of various embodiments, the invention is not restricted thereto, but rather may be modified in numerous ways.

In particular, the invention may be used for any desired number of pilot injections. The present total injection quantity may also be determined in some other way instead of by means of the activation time difference in the main injection, for example by means of a measurement.

It is also possible for further corrective data to be added to the defined corrective data, such as for example cylinder equalization data or injector equalization data, which reflect variance of the cylinders or of the injectors.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. Method for dosing fuel which is to be injected into a combustion chamber of an engine, with a fuel quantity dosed for an injector of the engine, the fuel quantity being divided into at least one pilot injection and a main injection for respective activation duration having activation duration corrective value, the method comprising:
storing correlation data between fuel injection quantity and activation time under at least a state parameter of the injector, wherein the fuel injection quantity includes reference total injection quantities determined for predetermined operating states of the engine;
determining a present operating state of the engine;
placing the engine into one of the predetermined operating states;
determining a present total injection quantity in the present operating state of the engine and a reference total injection quantity in the one of the predetermined operating states and in one of the at least a state parameter of the injector; and
defining the respective activation duration corrective value for the pilot injections and the main injection in consideration of a difference between the reference total injection quantity and the present total injection quantity.

2. Method according to claim 1, wherein the one of the at least a state parameter of the injector is a pressure in the injector.

3. Method according to claim 1, wherein the respective activation duration corrective value is determined by an activation duration difference divided by the number of pilot and main injections, the activation duration difference corresponding to difference of activation time of the reference total injection quantity and activation time of the present total injection quantity.

4. Method according to claim 1, wherein the fuel quantity which is to be dosed for the respective cylinder is divided into a first pilot injection, a second pilot injection and a single main injection.

5. Method according to claim 1, wherein the present operating state of the engine is an idle operating state.

6. Method according to claim 5, wherein the activation durations for the pilot injections are constant in the present operating state of the engine, and the main injection quantity is regulated by an idle regulator to attain a predetermined idle nominal speed.

7. Method according to claim 1, wherein injection amount of the pilot injection is between approximately 0.5 and approximately 0.8 mg/injection stroke.

8. Method according to claim 1, wherein the injection device is a common-rail injection device and the respective activation duration corrective value for the pilot injections and the main injection is defined at different operating pressures of the common-rail injection.

9. Method according to claim 1, wherein the reference total injection quantity is determined with an accuracy of approximately ±5%.

10. Device for dosing fuel which is to be injected into a combustion chamber of the engine, with a fuel quantity dosed for an injector of the engine, the fuel quantity being divided into at least one pilot injection and a main injection for respective activation duration having activation duration corrective value, comprising:
a memory device for storing correlation data between fuel injection quantity and activation time under at least a state parameter of the injector, wherein the fuel injection quantity includes reference total injection quantities determined for predetermined operating states of the engine;
a determining device for determining a present total injection quantity in a present operating state of the engine and a reference total injection quantity in the one of the predetermined operating states and in one of the at least a state parameter of the injector when the engine is placed into one of the predetermined operating states; and
a defining device for defining the respective activation duration corrective value for the pilot injections and the main injection in consideration of a difference between the reference total injection quantity and the present total injection quantity.

11. Device according to claim 10, wherein the one of the at least a state parameter of the injector is a pressure in the injector.

12. Device according to claim 10, wherein the respective activation duration corrective value is determined by an activation duration difference divided by the number of pilot and main injections, the activation duration difference corresponding to difference of activation time of the reference total injection quantity and activation time of the present total injection quantity.

13. Device according to claim 10, wherein the fuel quantity which is to be dosed for the respective cylinder is divided into a first pilot injection, a second pilot injection and a single main injection.

14. Device according to claim 10, wherein the present operating state of the engine is an idle operating state.

15. Device according to claim 14, wherein the activation durations for the pilot injections are constant in the present operating state of the engine, and the main injection quantity is regulated by an idle regulator to attain a predetermined idle nominal speed.

16. Device according to claim 10, wherein injection amount of the pilot injection is between approximately 0.5 and approximately 0.8 mg/injection stroke.

17. Device according to claim 10, wherein the injection device is a common-rail injection device and the respective activation duration corrective value for the pilot injections and the main injection is defined at different operating pressures of the common-rail injection device.

18. Device according to claim 10, wherein the reference total injection quantity is determined with an accuracy of approximately ±5%.

19. A passenger vehicle comprising the device according to claim 10.

* * * * *